(12) United States Patent
Jang et al.

(10) Patent No.: US 7,293,917 B2
(45) Date of Patent: Nov. 13, 2007

(54) SPINDLE MOTOR HAVING HYDRODYNAMIC PRESSURE BEARING

(75) Inventors: Ho Kyung Jang, Kyungki-do (KR); Tae Hyeong Lim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 208 days.

(21) Appl. No.: 11/156,795

(22) Filed: Jun. 21, 2005

(65) Prior Publication Data

US 2006/0147134 A1  Jul. 6, 2006

(30) Foreign Application Priority Data

Jan. 4, 2005    (KR) ............ 10-2005-0000347

(51) Int. Cl.
*F16C 32/06* (2006.01)
(52) U.S. Cl. ................. 384/123; 384/100
(58) Field of Classification Search ........ 384/100, 384/107, 121, 123
See application file for complete search history.

(56) References Cited

U.S. PATENT DOCUMENTS

| | | | | |
|---|---|---|---|---|
| 5,052,822 A | * | 10/1991 | Van Beek | 384/123 |
| 5,770,906 A | * | 6/1998 | Hazelton et al. | 384/123 |
| 6,017,150 A | * | 1/2000 | Lee | 384/123 |
| 6,467,963 B2 | * | 10/2002 | Sakuragi et al. | 384/107 |
| 6,955,469 B2 | * | 10/2005 | Gomyo | 384/107 |

FOREIGN PATENT DOCUMENTS

| | | |
|---|---|---|
| JP | 08-084453 A | 3/1996 |
| JP | 2001-065552 A | 3/2001 |
| JP | 2001-140860 A | 5/2001 |
| JP | 2004-44789 A | 2/2004 |

OTHER PUBLICATIONS

Japanese Patent Office, Office Action mailed Sep. 4, 2007 and English Translation.

* cited by examiner

*Primary Examiner*—Thomas R. Hannon
(74) *Attorney, Agent, or Firm*—Lowe Hauptman Ham & Berner (57) ABSTRACT

A spindle motor having a hydrodynamic pressure bearing includes a stator, a rotor, and a dynamic pressure generating unit including a sleeve having an upper plate disposed opposite to the rotor and at least one thrust dynamic pressure groove formed either at the upper plate of the sleeve or at the rotor. Inside width from a neutral radius to an innermost radius of the thrust dynamic pressure groove is larger than outside width from the neutral radius to an outermost radius of the thrust dynamic pressure groove such that the neutral radius is biased to the outside of the thrust dynamic pressure groove. Dynamic pressure at the inside width of the thrust dynamic pressure groove is higher than dynamic pressure at the outside width of the thrust dynamic pressure groove such that fluid supplied into the thrust dynamic pressure groove is guided to the outer diameter side.

16 Claims, 10 Drawing Sheets

SPINDLE MOTOR HAVING HYDRODYNAMIC PRESSURE BEARING

RELATED APPLICATIONS

The present application is based on, and claims priority from, Korean Application Number 2005-347, filed Jan. 4, 2005, the disclosure of which is incorporated by reference herein in its entirety.

BACKGROUND OF THE INVENTION

1. Field of the Invention

The present invention relates to a spindle motor having a hydrodynamic pressure bearing, and more particularly to a spindle motor that is capable of circulating fluid supplied into dynamic pressure grooves to increase the service life of the fluid and the service life of the motor, and of reducing vertical variation between the center of gravity of a rotary body and the center of dynamic pressure to minimize occurrence of vibration from the motor and improve driving characteristics.

2. Description of the Related Art

Generally, a motor having a ball bearing has a problem in that friction occurs between a sleeve of the ball bearing and a shaft of the ball bearing, by which noise and vibration are generated. Such vibration is called non-repeatable run out (NRRO), which is an obstacle to increasing track density of a hard disk.

On the other hand, a spindle motor having a hydrodynamic pressure bearing maintains the axial rigidity of a shaft of the bearing only using dynamic pressure of lubricating oil due to centrifugal force. As a result, no metal friction of the spindle motor occurs, and the stability of the spindle motor is increased as the spindle motor is rotated at higher speed. Consequently, the spindle motor having the hydrodynamic pressure bearing has the effect of minimizing occurrence of noise and vibration. In the spindle motor having the hydrodynamic pressure bearing, the high-speed rotation of a rotary body is more smoothly carried out than the motor having the ball bearing. As a result, the spindle motor having the hydrodynamic pressure bearing is principally applied to high-end optical disk apparatuses, magnetic disk apparatuses, and hard disk apparatuses.

The hydrodynamic pressure bearing mounted in the spindle motor having the above-mentioned characteristics comprises: a shaft, which is the center of rotation; and a metal sleeve fitted on the shaft such that the metal sleeve and the shaft together define a sliding surface therebetween. At the shaft or the metal sleeve are formed herringbone-shaped or spiral dynamic pressure generation grooves.

In the gap minutely formed at the sliding surface defined between the shaft and the sleeve is filled fluid, for example, lubricating oil such that frictional members are kept not in contact with each other due to hydrodynamic pressure generated from the dynamic pressure generation grooves of the sliding surface. In this way, the hydrodynamic pressure bearing reduces the frictional load when the spindle motor is rotated and supports a rotary member, i.e., a rotor, of the spindle motor.

When the hydrodynamic pressure bearing with the above-stated construction is applied to the spindle motor, the amount of noise generated from the motor is small as rotation of the rotor is supported by the fluid, the power consumption is low, and the impact resistance is excellent.

Figure 10:
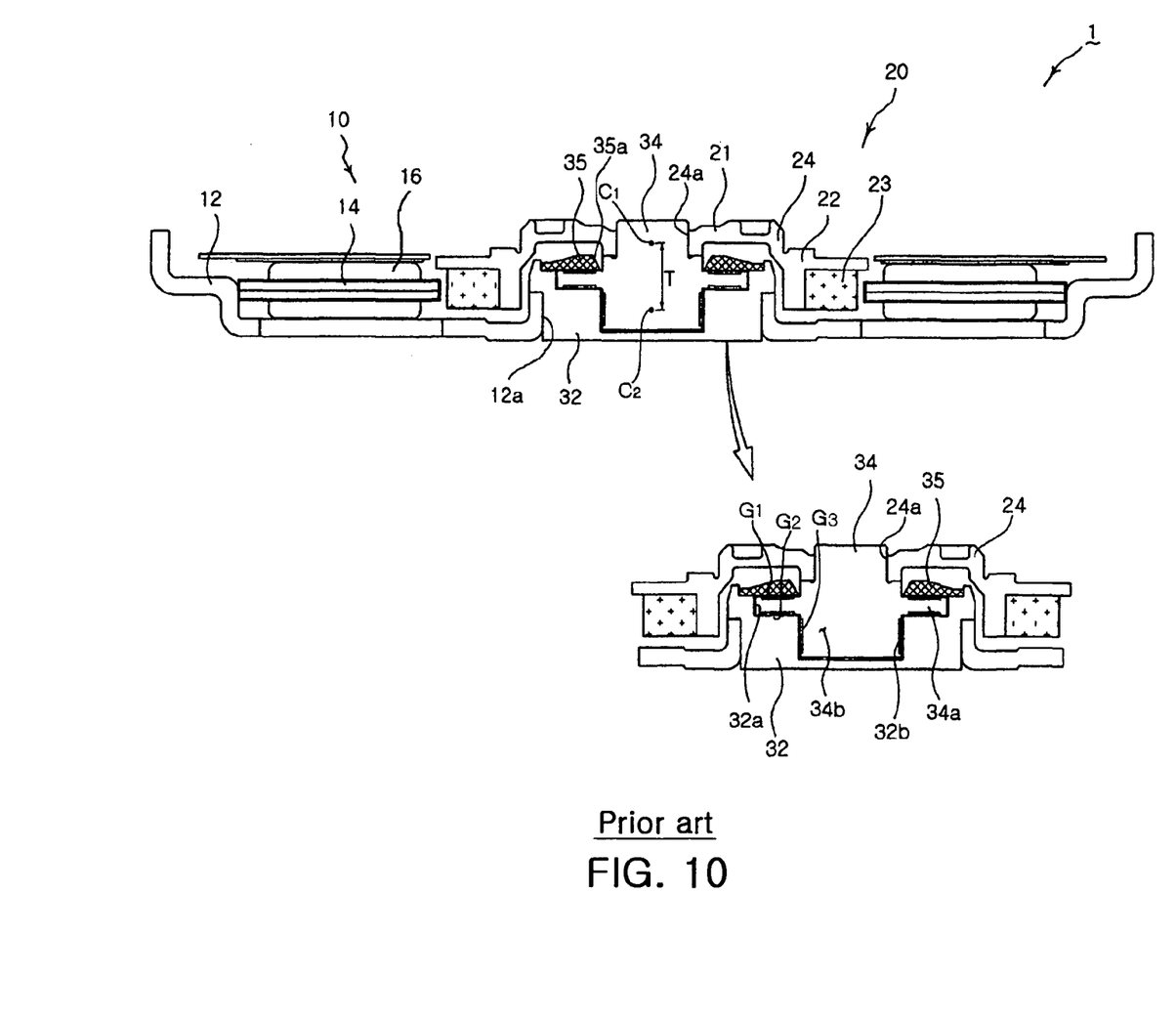
FIG. 10 is a cross-sectional view illustrating a conventional spindle motor having a hydrodynamic pressure bearing.

FIG. 10 is a cross-sectional view illustrating a conventional spindle motor 1 having a hydrodynamic pressure bearing. As shown in FIG. 10, the conventional spindle motor 1 comprises a stator 10 and a rotor 20. The stator 10 comprises: a base 12, in the center of which a metal cylindrical sleeve 32 is disposed; and a plurality of cores 14 disposed on the base 12 while extending in the radial direction thereof about a pole. On at least one of the cores 14 is wound a coil 16.

The rotor 20, which is rotated relative to the stator 10, includes a cup-shaped hub 24. The hub 24 comprises: a boss part 21, in which the upper end of a shaft 34, which is the center of rotation, is fitted; and a skirt part 22, to which a magnet 23 is mounted while the magnet 23 corresponds to the coil 16. The lower part of the shaft 34 is fitted in the sleeve 32.

The sleeve 32 is a rotation-supporting member that is fixedly inserted in a fixing hole 12a formed through the center of the base 12. In the sleeve are formed large and small inner diameter parts 32a and 32b, in which the shaft 34 is fitted. The shaft 34 has large and small outer diameter parts 34a and 34b, in which the large and small inner diameter parts 32a and 32b of the sleeve 34 are fitted, respectively.

At the upper end of the sleeve 32 is disposed a ring-shaped stopper ring 35, which pushes the shaft 34 downward for preventing the shaft 34 from separating from the sleeve 32. At the large and small outer diameter parts 34a and 34b of the shaft 34, which are in contact with the sleeve 32 and the stopper ring 35, are formed dynamic pressure generation grooves G1, G2, and G3, respectively, by which minute gaps, i.e., sliding surfaces, are formed.

When fluid, for example, lubricating oil, is filled in the sliding surfaces defined between the inner diameter of the sleeve 32 and the outer diameter of the shaft 34, an upper thrust dynamic pressure part for generating dynamic pressure according to relative rotation is formed between the lower surface of the stopper ring 35 and the upper surface of the large outer diameter part 34a of the shaft 34, and a lower thrust dynamic pressure part for generating dynamic pressure according to relative rotation is formed between the lower surface of the large outer diameter part 34a of the shaft 34 and the bottom surface of the large inner diameter part 32a of the sleeve 32.

Between the inner circumferential surface of the small inner diameter part 32b of the sleeve 32 and the outer circumferential surface of the small outer diameter part 34b of the shaft 34 is also formed a radial dynamic pressure part for generating dynamic pressure according to relative rotation.

When the conventional spindle motor 1 with the above-stated construction is operated, however, the center of gravity C1 of the rotary body, including the shaft 34 and the rotor 20, is formed in the vicinity of the upper end of the shaft 34 fitted in a connection hole 24a formed at the center of the hub 24 while the center of radial dynamic pressure C2 of the radial dynamic pressure part formed between the small outer diameter part 34b of the shaft 34 and the small inner diameter part 32b of the sleeve 32 is formed at the lower part of the shaft 34, i.e., at the middle of the small outer diameter part 34b of the shaft 34.

As a result, the position where the center of gravity C1 of the rotor 20 is formed from the shaft 34 is relatively away from the position where the center of radial dynamic pressure C2 of the radial dynamic pressure part formed at the shaft 34, as shown in FIG. 10, and therefore, vertical variation T occurs between the center of gravity C1 and the center of radial dynamic pressure C2.

When the spindle motor 1 is operated in the above-mentioned state, and therefore, the rotor is rotated in one direction, the rotary body, including the rotor 20 and the shaft 34, is eccentric due to the vertical variation T. As a result, the vibration characteristics of the spindle motor are deteriorated. As the vertical variation T between the center of gravity C1 and the center of radial dynamic pressure C2 is increased, the rate at which vibration is generated is also increased.

At the inner circumferential surface of the stopper ring 35 is formed a tapered surface 35a to provide an oil storing part for storing a predetermined amount of oil between the tapered surface 35a of the stopper ring 35 and the outer diameter part of the shaft 34. However, the position of the oil storing part is high, and the length of a passage connected between the oil storing part and the outside is small. Consequently, when the spindle motor is operated, oil discharged from the oil storing part easily leaks to the outside through the passage between the hub 24 and the stator 10.

As a result, the stator 10 is contaminated by the oil leaking to the outside, and a rotary object, i.e., a medium, rotating along with the rotor 20 is also contaminated by the leaking oil.

The lower end of the shaft 34, the upper end of which is fixedly fitted in the hub 24 of the rotor 20, extends to the bottom surface of the inner diameter part of the sleeve 32. Also, the large outer diameter part 34a of the shaft 34 extends in the outer circumferential direction. The shaft 34 having the above-stated shape is rotated along with the hub 24. As a result, the total weight of the rotor 20 is increased, which increases inertia of the rotor 20 when the spindle motor is operated, and therefore, the accurate control of the speed of the spindle motor is difficult, and the impact resistance is lowered.

Furthermore, it is necessary that the thrust dynamic pressure generation grooves G1 and G2 be provided to form the upper thrust dynamic pressure part between the lower surface of the stopper ring 35 and the upper surface of the large outer diameter part 34a of the shaft 34 and the lower thrust dynamic pressure part between the lower surface of the large outer diameter part 34a of the shaft 34 and the bottom surface of the large inner diameter part 32a of the sleeve 32. Also, it is necessary that the radial dynamic pressure generation groove G3 be provided to form the radial dynamic pressure part between the inner circumferential surface of the small inner diameter part 32b of the sleeve 32 and the outer circumferential surface of the small outer diameter part 34b of the shaft 34.

However, it is necessary that the dynamic pressure generation grooves G1, G2, and G3 be precisely formed at the shaft 34 with a precision of the µm level. As a result, the costs necessary to precisely form the dynamic pressure generation grooves G1, G2, and G3 are increased, and therefore, the manufacturing costs of the spindle motor are also increased.

In addition, it is difficult to reduce the length of the shaft 34, when the spindle motor is designed, because the radial dynamic pressure generation groove G3 necessary to form the radial dynamic pressure part is provided at the shaft 34. As a result, it is not possible to reduce the height of the spindle motor, and therefore, the miniaturization of the spindle motor is limited.

SUMMARY OF THE INVENTION

Therefore, the present invention has been made in view of the above problems, and it is an object of the present invention to provide a spindle motor having a hydrodynamic pressure bearing that is capable of circulating fluid supplied into dynamic pressure grooves, thereby increasing the service life of the fluid and the service life of the motor.

It is another object of the present invention to provide a spindle motor having a hydrodynamic pressure bearing that is capable of reducing vertical variation between the center of gravity of a rotary body and the center of dynamic pressure, thereby minimizing occurrence of vibration from the motor and improving driving characteristics.

It is another object of the present invention to provide a spindle motor having a hydrodynamic pressure bearing that is capable of reducing the total weight of the rotary body to decrease inertia when the motor is operated, thereby accurately controlling the speed of the motor.

It is another object of the present invention to provide a spindle motor having a hydrodynamic pressure bearing that is capable of increasing the coupling area between a hub and a stopper ring, thereby improving axial rigidity and impact resistance.

It is another object of the present invention to provide a spindle motor having a hydrodynamic pressure bearing that is capable of complicating the structure of a passage, through which oil leaks to the outside, thereby preventing a stator of the spindle motor and a medium from being contaminated.

It is another object of the present invention to provide a spindle motor having a hydrodynamic pressure bearing that is capable of reducing the costs necessary to precisely form dynamic pressure generation grooves, thereby decreasing the manufacturing costs of the spindle motor.

It is another object of the present invention to provide a spindle motor having a hydrodynamic pressure bearing that is capable of reducing the total height of the spindle motor, thereby accomplishing miniaturization of the spindle motor.

In accordance with the present invention, the above and other objects can be accomplished by the provision of a spindle motor having a hydrodynamic pressure bearing, comprising: a stator including a coil for generating electromagnetic force when the coil is supplied with electric current to generate a rotary driving force; a rotor including magnets disposed opposite to the coil such that the rotor can be rotated relative to the stator; and a dynamic pressure generating unit including a sleeve having an upper plate disposed opposite to the rotor while being spaced a predetermined distance from the rotor, the sleeve being fixed to the stator, and at least one thrust dynamic pressure groove formed either at the upper plate of the sleeve corresponding to the rotor or at the rotor for generating dynamic pressure, wherein the inside width from a neutral radius of the thrust dynamic pressure groove to an innermost radius of the thrust dynamic pressure groove is larger than the outside width from the neutral radius of the thrust dynamic pressure groove to an outermost radius of the thrust dynamic pressure groove such that the neutral radius is biased to the outside of the thrust dynamic pressure groove, and dynamic pressure at the inside width of the thrust dynamic pressure groove is higher than dynamic pressure at the outside width of the thrust dynamic pressure groove such that fluid supplied into the thrust dynamic pressure groove is guided to the outer diameter side.

Preferably, the stator comprises: at least one core, on which the coil is wound; and a base having a fixing hole, in which the sleeve is vertically fitted, and a housing is fitted in the fixing hole of the stator while the lower end of the sleeve is fixedly inserted in the housing.

Preferably, the rotor comprises: a hub disposed opposite to the upper surface of the upper plate, the hub is provided with the magnets; and a stopper ring mounted in the inner surface of the hub, the stopper ring being disposed opposite to the lower surface of the upper plate.

More preferably, the hub comprises: a skirt part, to which the magnets are attached; and a shaft extending downward by a predetermined length such that the shaft is fitted in a shaft hole of the sleeve.

More preferably, the hub comprises: a skirt part, to which the magnets are attached; and a supporting part formed through the hub for allowing a protrusion formed at the upper end of the sleeve to be inserted therethrough.

Preferably, the at least one thrust dynamic pressure groove is formed either at the upper surface or at the lower surface of the upper plate of the sleeve.

Preferably, the at least one thrust dynamic pressure groove comprises thrust dynamic pressure grooves formed at the upper and lower surfaces of the upper plate of the sleeve, respectively.

Preferably, the at least one thrust dynamic pressure groove is formed either at the lower surface of the hub of the rotor corresponding to the upper plate of the sleeve or at the upper surface of the stopper ring of the rotor.

Preferably, the at least one thrust dynamic pressure groove comprises thrust dynamic pressure grooves formed at the lower surface of the hub of the rotor corresponding to the upper plate of the sleeve or at the upper surface of the stopper ring of the rotor, respectively.

Preferably, the at least one thrust dynamic pressure groove is formed either in the shape of a herringbone or in a spiral shape.

Preferably, the upper plate of the sleeve is provided at the outer circumferential surface thereof with at least one vertical groove. More preferably, the at least one vertical groove is formed at the outer circumferential surface of the upper plate of the sleeve corresponding to the outer end of the thrust dynamic pressure groove.

Preferably, the upper plate of the sleeve is provided with at least one fluid circulating part, which is formed through the upper plate from the upper surface to the lower surface thereof. More preferably, the at least one fluid circulating part is disposed either at the inside width of the thrust dynamic pressure groove or in the vicinity of the inside width of the thrust dynamic pressure groove. More preferably, the inside width of the upper thrust dynamic pressure groove corresponding to the upper end of the fluid circulating part is narrower than that of the lower thrust dynamic pressure groove corresponding to the lower end of the fluid circulating part.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
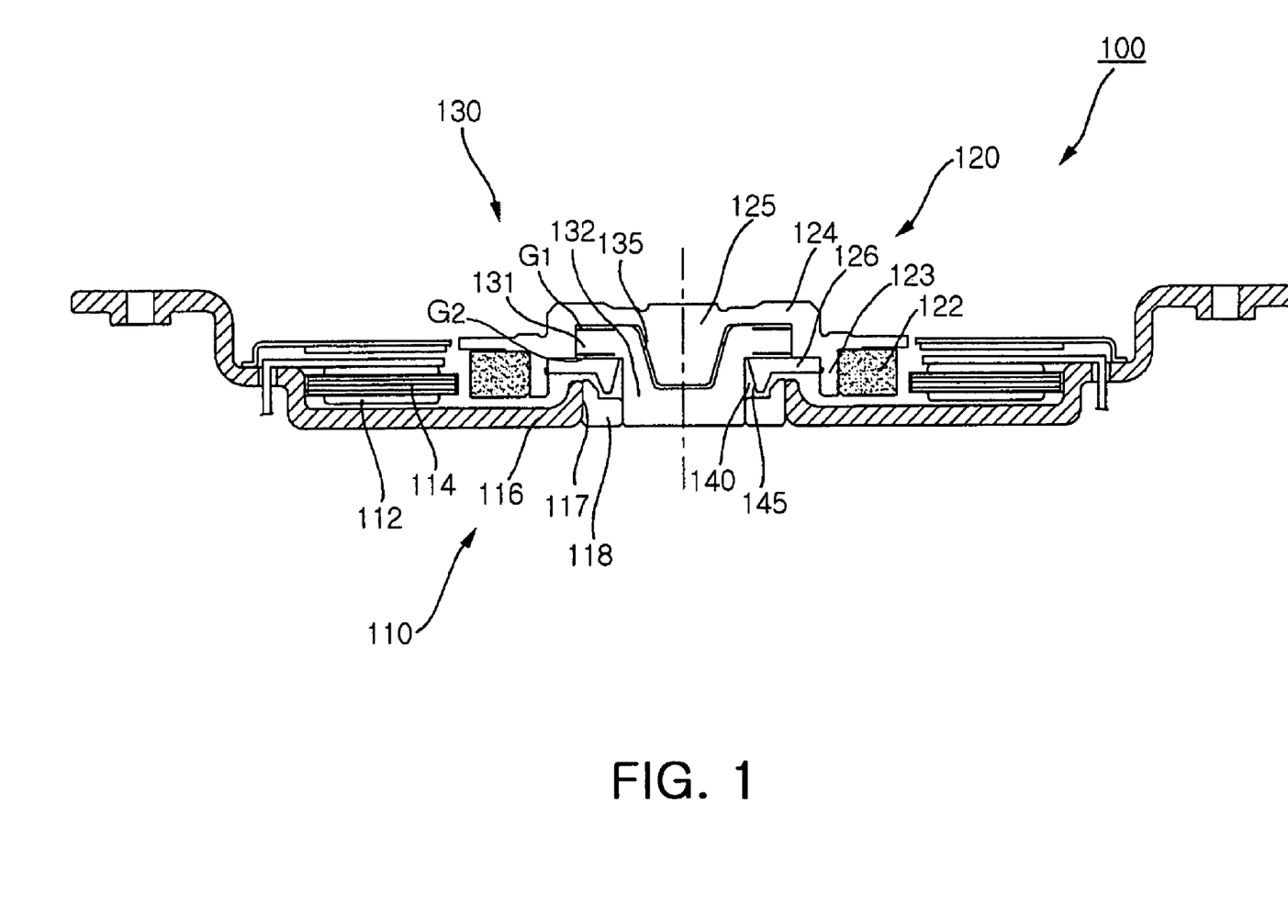
FIG. 1 is a cross-sectional view illustrating a spindle motor having a hydrodynamic pressure bearing according to a first preferred embodiment of the present invention.
Figure 2A:
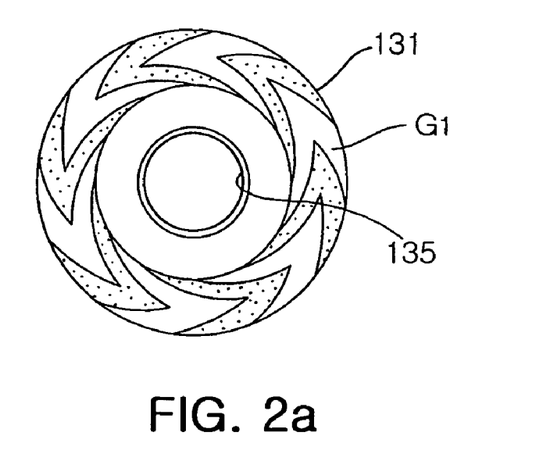
FIG. 2A is a plan view illustrating a sleeve of the spindle motor having the hydrodynamic pressure bearing according to the first preferred embodiment of the present invention.
Figure 2B:
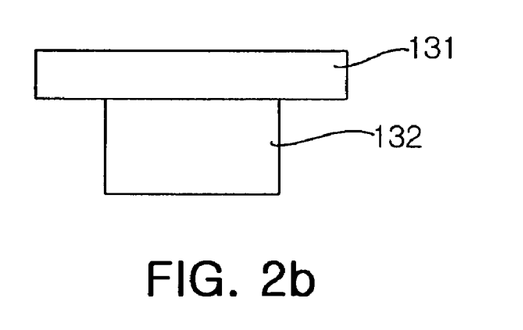
FIG. 2B is a front view illustrating the sleeve of the spindle motor having the hydrodynamic pressure bearing according to the first preferred embodiment of the present invention.
Figure 2C:
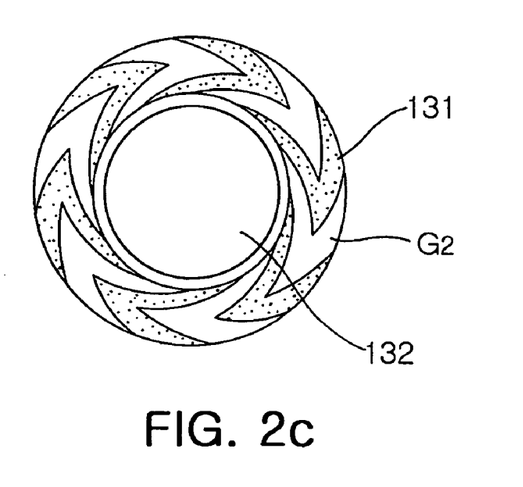
FIG. 2C is a bottom view illustrating the sleeve of the spindle motor having the hydrodynamic pressure bearing according to the first preferred embodiment of the present invention.
Figure 3:
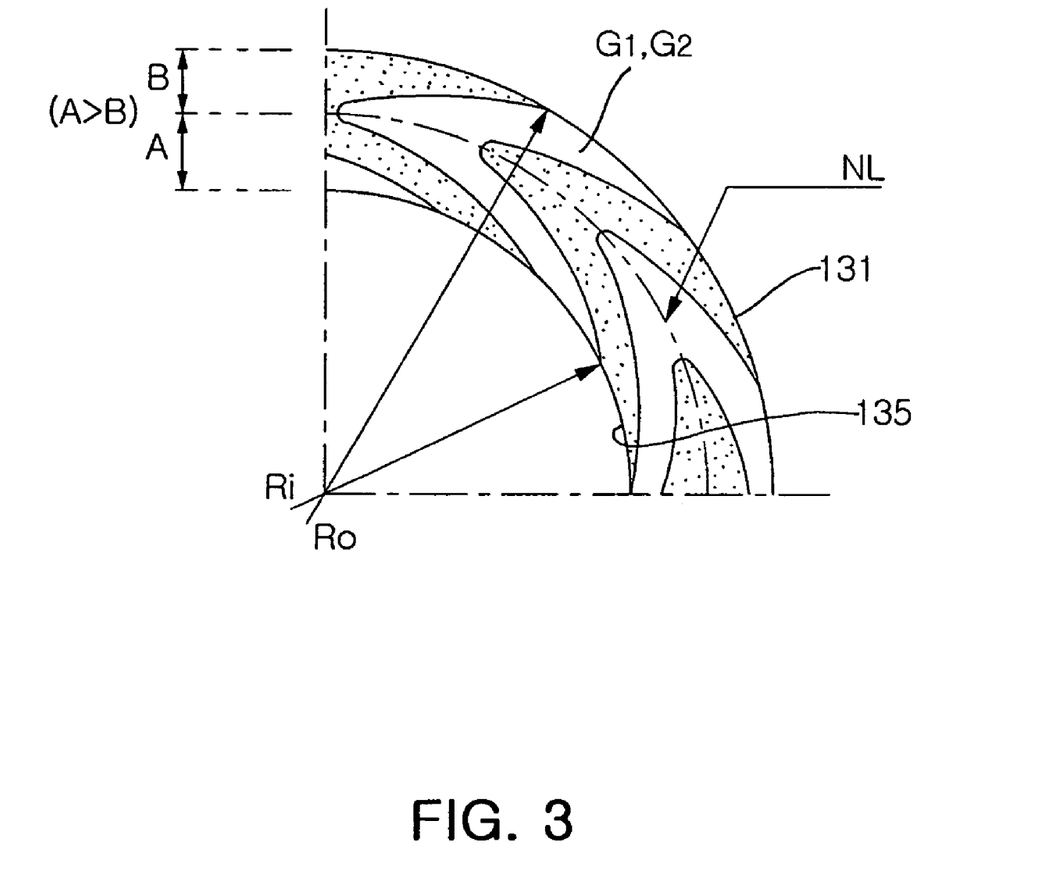
FIG. 3 is a detailed view, in part, illustrating thrust dynamic pressure grooves of the spindle motor having the hydrodynamic pressure bearing according to the first preferred embodiment of the present invention.

FIG. 1 is a cross-sectional view illustrating a spindle motor 100 having a hydrodynamic pressure bearing according to a first preferred embodiment of the present invention, FIG. 2A is a plan view illustrating a sleeve of the spindle motor 100 having the hydrodynamic pressure bearing according to the first preferred embodiment of the present invention, FIG. 2B is a front view illustrating the sleeve of the spindle motor 100 having the hydrodynamic pressure bearing according to the first preferred embodiment of the present invention, FIG. 2C is a bottom view illustrating the sleeve of the spindle motor 100 having the hydrodynamic pressure bearing according to the first preferred embodiment of the present invention, and FIG. 3 is a detailed view, in part, illustrating thrust dynamic pressure grooves of the spindle motor 100 having the hydrodynamic pressure bearing according to the first preferred embodiment of the present invention.

As shown in FIGS. 1 to 3, the spindle motor according to the first preferred embodiment of the present invention, in which the center of gravity of a rotary body approximately corresponds to the center of dynamic pressure to minimize vertical variation between the center of gravity and the center of dynamic pressure, comprises a stator 110, a rotor 120, and a dynamic pressure generating unit 130.

The stator 110 comprises: a coil 112 for generating a predetermined amount of electromagnetic force when the coil 112 is supplied with electric current; and a plurality of cores 114 while extending in the radial direction thereof about a pole. On at least one of the cores 114 is wound a coil 112.

The cores 114 are fixedly mounted above a base 116, which is provided with a printed circuit board (not shown). At the upper surface of the base 116 is formed a fixing hole 117 having a predetermined size. In the fixing hole 117 is fitted a rotation-supporting member for supporting the rotation of the rotor 120.

At the upper surface of the base 116, which corresponds to the coil 112, are formed a plurality of coil holes each having a predetermined size, through which the coils 112 are exposed downward.

The top of the stator 110 is covered by a cover member having an insulating material (not shown) attached to the lower surface thereof. The coil 112 is electrically connected to a flexible board such that external electric current is supplied to the coil 112.

The rotor 120 is a rotary member that is capable of rotating relative to the stator 110. The rotor 120 comprises a cup-shaped hub 124. The hub 124 is provided at the outer circumferential surface thereof with ring-shaped magnets 122, which are spaced a predetermined distance from the cores 114. Preferably, the magnets 122 are permanent magnets that are disposed with alternating N and S poles in the circumferential direction thereof for generating magnetic force having a predetermined strength.

The hub 124, which is rotated along with the magnets 122 when the motor is operated, comprises: a skirt part 123, to which the magnets 122 are attached; and a shaft 125 extending from the bottom surface of the hub 124 by a predetermined length, the shaft 125 being disposed on a vertical axis corresponding to the center of rotation of the hub 124. The shaft 125 is fitted in a shaft hole 135 of a sleeve 132, which will be described below.

Between the outer circumferential surface of the shaft 125 and the inner circumferential surface of the shaft hole 135 is preferably defined a predetermined gap, by which no contact-friction force occurs therebetween when the motor is operated.

In the inner surface of the skirt part constituting the hub 124 is fitted a stopper ring 126, the upper surface of which is in contact with the lower surface of an upper plate 131 of the sleeve 132, which is a fixing member mounted to the stator 110. As a result, the hub 124 is prevented from being separated from the stator 110 by the engagement between the stopper ring 126 and the sleeve 132.

At the rotation center of the upper surface of the hub 124 is integrally disposed a rotary object (not shown), such as a turntable, such that the rotary object is rotated in one direction along with the hub 124 when the motor is rotated. The rotary object may take various forms based on the respective devices to which the spindle motor according to the present invention is applied.

The dynamic pressure generating unit 130, which generates hydrodynamic pressure at the interface between the rotary body and the stationary body, comprises a sleeve 132, which is vertically attached to the stator 110. The lower end of the sleeve 132 is fixed to the stator 110. At the upper end of the sleeve 132 is formed an upper plate 131 having an outer diameter larger than that of the sleeve 132. At the upper surface of the sleeve 132 is formed a shaft hole 135, which is depressed to a predetermined depth such that the shaft 125 of the hub 124 is inserted into the shaft hole 135.

As shown in FIG. 1, the lower end of the sleeve 132 having a small outer diameter is forcibly inserted in a hollow cylindrical housing 118 fitted in the fixing hole 117 of the stator 110.

Figure 4:
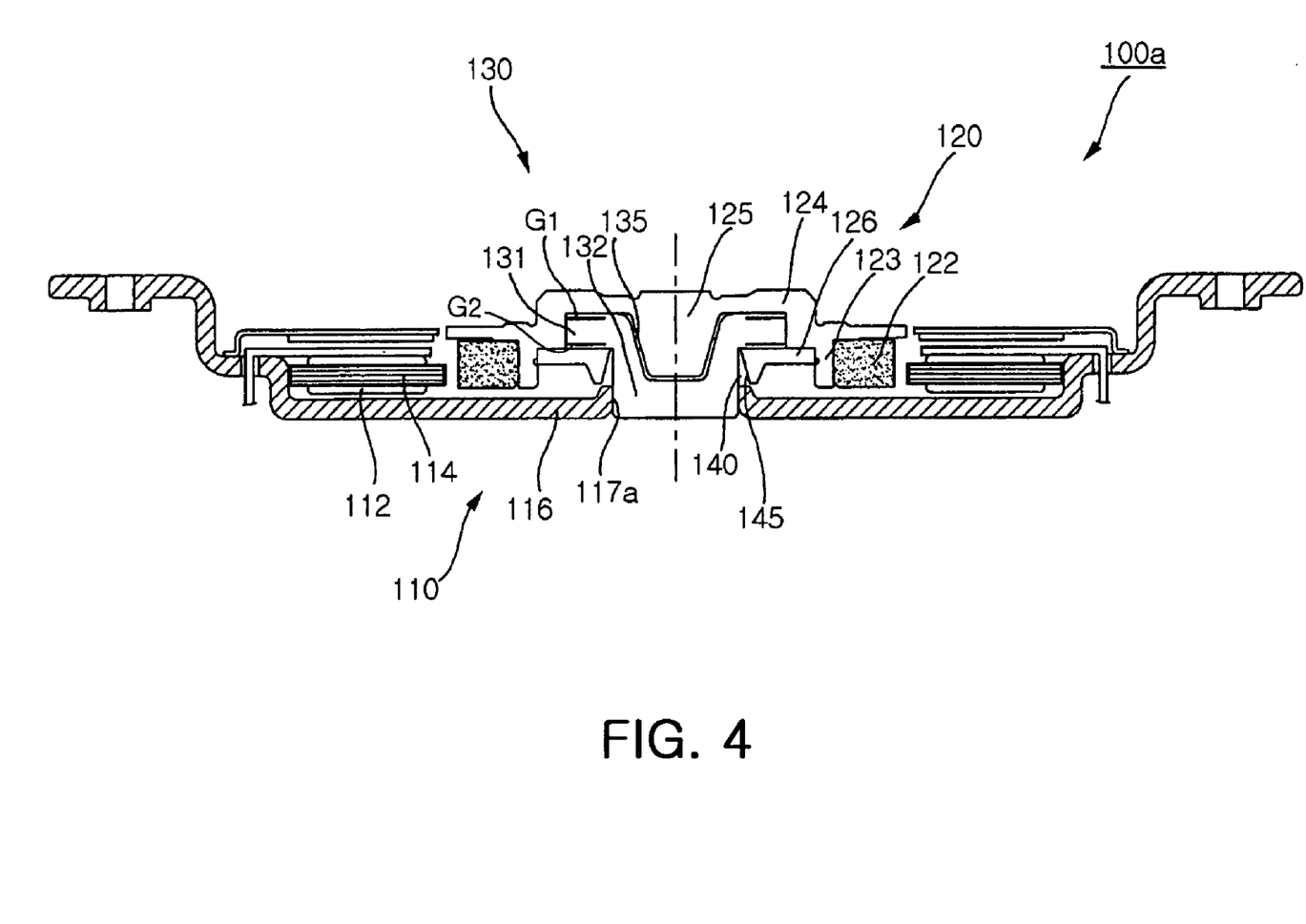
FIG. 4 is a cross-sectional view illustrating a spindle motor having a hydrodynamic pressure bearing according to a second preferred embodiment of the present invention.

Alternatively, the lower end of the sleeve 132 may be forcibly inserted in a fixing hole 117a formed through the base 116 such that the fixing hole 117a has an inner diameter corresponding to the outer diameter of the lower end of the sleeve 132, as shown in FIG. 4. In this way, another type of spindle motor 100a may be constructed.

In the spindle motor 100a as shown in FIG. 4, the number of parts to be assembled is decreased, and therefore, a motor assembling process is simplified, and the manufacturing costs of the motor is reduced.

Preferably, the fixing hole 117 is formed such that the fixing hole 117 corresponds to the outer diameter of the housing 118 or the outer diameter of the lower end of the sleeve. Also preferably, the inner circumferential surface of the fixing hole 117 extends upward to a predetermined height such that the coupling force between the fixing hole 117 and the member inserted in the fixing hole 117 is increased.

The housing 118 is attached to the inner circumferential surface of the fixing hole 117 in a bonding or hot pressure inserting fashion, although the housing 118 may be securely fitted in the fixing hole 117 in other different ways.

The sleeve 132 is a rotation-supporting member that is disposed while being spaced a predetermined distance from the rotor 120 to define a sliding surface therebetween. At the hub 124 and the stopper ring 126 of the rotor 120 or at the upper and lower surfaces of the upper plate 131 of the sleeve 132 corresponding to the hub 124 and the stopper ring 126 of the rotor 120 are formed thrust dynamic pressure grooves G1 and G2 for generating dynamic pressure, respectively.

As shown in FIGS. 1 and 2, the thrust dynamic pressure grooves G1 and G2 are formed at the upper and lower surfaces of the upper plate 131 corresponding to the rotor 120 for simultaneously generating upper and lower thrust dynamic pressures when the motor is operated. However, it is also possible for the thrust dynamic pressure grooves to be formed either at the upper surface of the upper plate 131 for generating the upper thrust dynamic pressure or at the lower surface of the upper plate 131 for generating the lower thrust dynamic pressure.

As shown in FIGS. 1 and 2, the thrust dynamic pressure grooves G1 and G2 are formed at the upper and lower surfaces of the upper plate 131. However, it is also possible for the thrust dynamic pressure grooves G1 and G2 to formed at the lower surface of the hub 124 and the upper surface of the stopper ring 126, which correspond to the upper and lower surfaces of the upper plate 131, respectively, for simultaneously generating upper and lower thrust dynamic pressures when the motor is operated. Alternatively, the thrust dynamic pressure grooves may be formed either at the lower surface of the hub 124 for generating the upper thrust dynamic pressure or at the upper surface of the stopper ring 126 for generating the lower thrust dynamic pressure.

The thrust dynamic pressure grooves G1 and G2 are formed at the upper and lower surfaces of the upper plate 131 or the lower surface of the hub 124 of the rotor 120 and the upper surface of the stopper ring 126 in the shape of a herringbone or in a spiral shape based on the design of the spindle motor by cutting, coining, etching, or laser processing.

Preferably, the thrust dynamic pressure grooves G1 and G2 for simultaneously generating upper and lower thrust dynamic pressures are formed in the same shape. Alternatively, the thrust dynamic pressure grooves G1 and G2 for simultaneously generating upper and lower thrust dynamic pressures are formed in different shape, which accomplishes the same dynamic pressure bearing effect.

Fluid, such as oil or air, is supplied into the gap defined between the rotor 120 and the sleeve 132 such that the fluid fills the thrust dynamic pressure grooves G1 and G2. When the motor is operated, the fluid in the thrust dynamic pressure grooves G1 and G2 formed at the dynamic pressure generating unit 130 is subjected to high pressure, forming fluid films. As a result, the sliding surface between the sleeve 132 and the rotor 120 is in a fluid friction state, in which frictional load is minimized, and therefore, the motor is rotated without noise and vibration.

As shown in FIG. 3, each of the thrust dynamic pressure grooves G1 and G2 is provided, at the insides and outsides thereof about an imaginary neutral radius NL at which dynamic pressure generated when the motor is operated is in equilibrium, with an inside width A and an outside width B, respectively.

The inside width A is the shortest distance from the neutral radius NL to the innermost radius Ri, and the outside width B is the shortest distance from the neutral radius NL to the outermost radius Ro.

The size of the inside width A is larger than that of the outside width B such that the thrust dynamic pressure generated at the inside width A is higher than the thrust dynamic pressure generated at the outside width B. In this case, the fluid supplied into the thrust dynamic pressure grooves G1 and G2 is naturally guided from the inside widths A, at which relatively high dynamic pressure is generated due to the difference in size between the inside widths A and the outside widths B, to the outside widths B, at which relatively low dynamic pressure is generated due to the difference in size between the inside widths A and the outside widths B. The fluid guided into the outside widths B flows to the radial side, i.e., the outer diameter side of the upper plate 131.

Between the stopper ring 126 and the sleeve 132 is formed an oil storing part 140 for storing a predetermined amount of oil, as shown in FIGS. 1 and 4. Specifically, the oil storing part 140 is formed between the outer surface of the sleeve 132 and a tapered surface 145 formed at the inner circumferential surface of the stopper ring 126 such that the outer diameter of the tapered surface 145 is gradually decreased toward the lower end of the tapered surface 145. A capillary phenomenon occurs between the outer surface of the sleeve 132 and the tapered surface 145 of the stopper ring 126, and as a result, a ring-shaped oil storing space for storing oil is formed.

Figure 5:
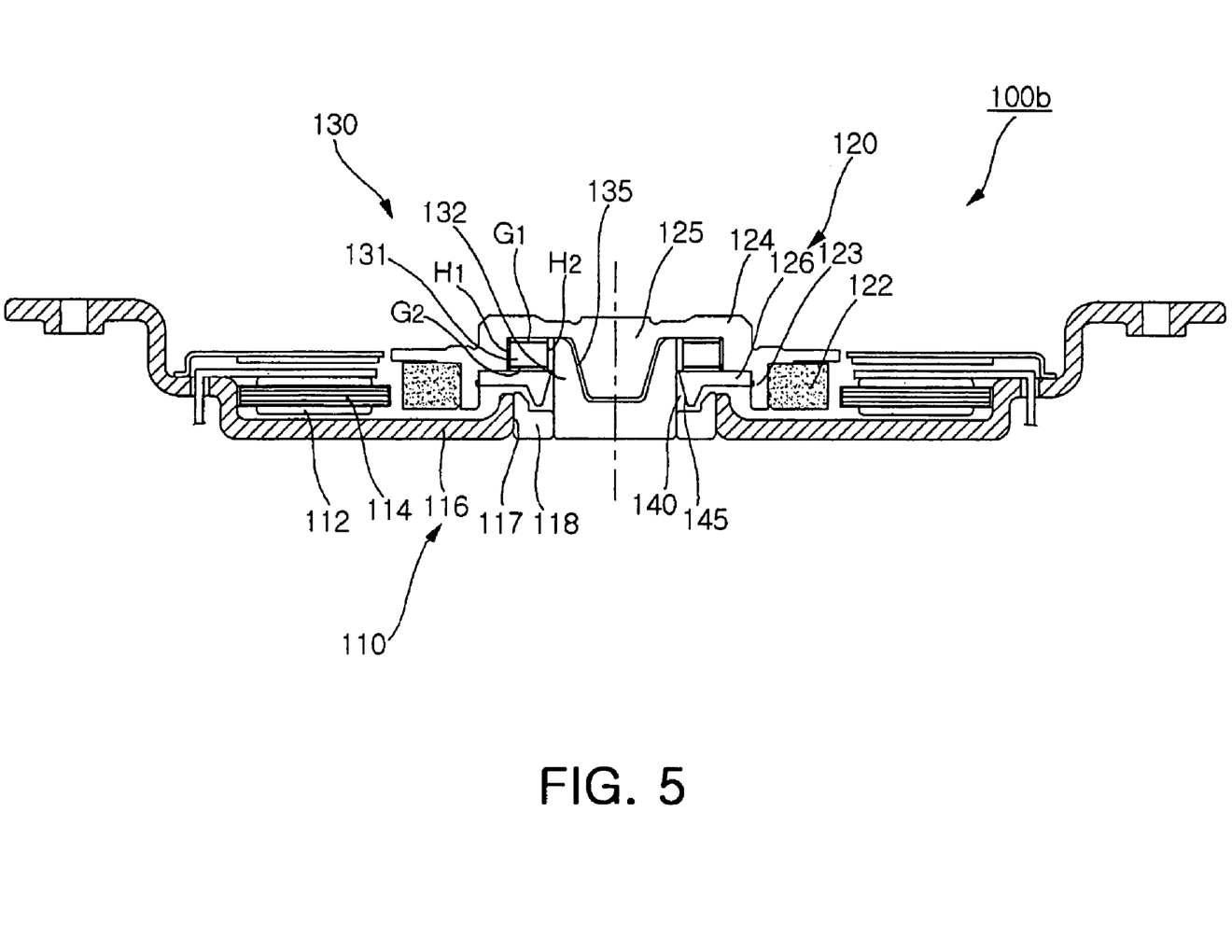
FIG. 5 is a cross-sectional view illustrating a spindle motor having a hydrodynamic pressure bearing according to a third preferred embodiment of the present invention.
Figure 6A:
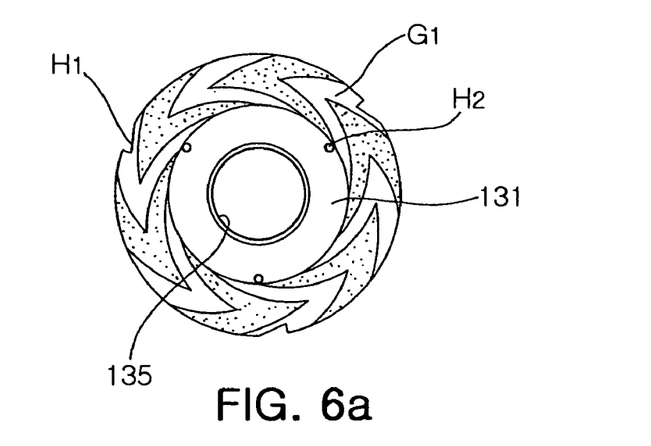
FIG. 6A is a plan view illustrating a herringbone-shaped sleeve of the spindle motor having the hydrodynamic pressure bearing according to the third preferred embodiment of the present invention.
Figure 6B:
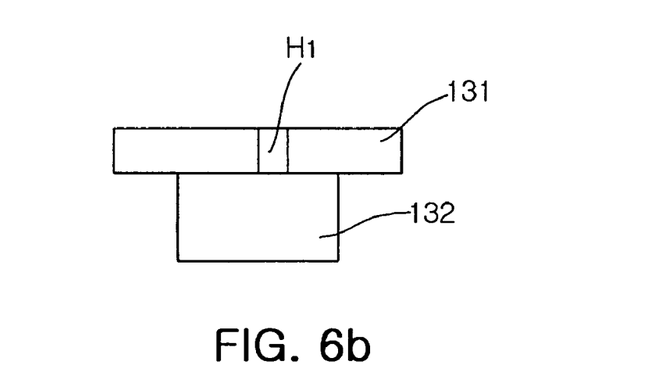
FIG. 6B is a front view illustrating the herringbone-shaped sleeve of the spindle motor having the hydrodynamic pressure bearing according to the third preferred embodiment of the present invention.
Figure 6C:
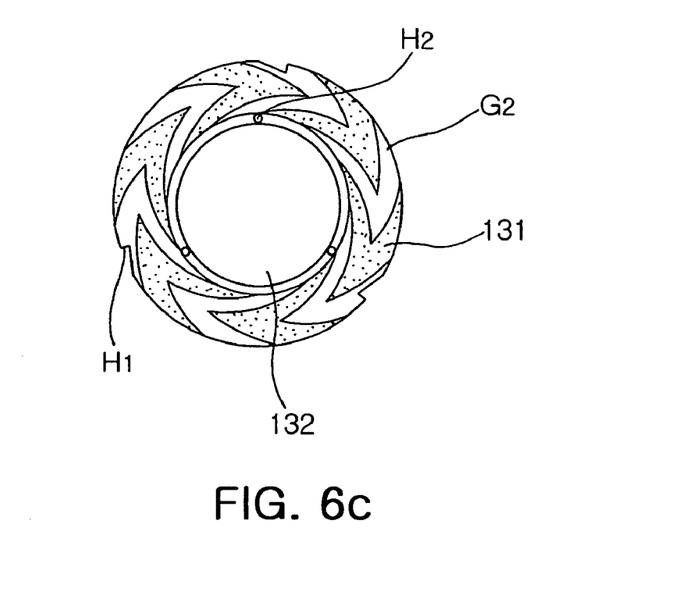
FIG. 6C is a bottom view illustrating the herringbone-shaped sleeve of the spindle motor having the hydrodynamic pressure bearing according to the third preferred embodiment of the present invention.

FIG. 5 is a cross-sectional view illustrating a spindle motor 100b having a hydrodynamic pressure bearing according to a third preferred embodiment of the present invention, FIG. 6A is a plan view illustrating a herringbone-shaped sleeve of the spindle motor 100b having the hydrodynamic pressure bearing according to the third preferred embodiment of the present invention, FIG. 6B is a front view illustrating the herringbone-shaped sleeve of the spindle motor 100b having the hydrodynamic pressure bearing according to the third preferred embodiment of the present invention, and FIG. 6C is a bottom view illustrating the herringbone-shaped sleeve of the spindle motor 100b having the hydrodynamic pressure bearing according to the third preferred embodiment of the present invention. As shown in FIGS. 5 to 6C, the upper plate 131 of the sleeve 132 of the spindle motor 100b is provided at the outer circumferential surface thereof with at least one vertical groove H1 such that fluid guided to the outer diameter side when the motor is operated is supplied to the space between the outer circumferential surface of the upper plate 131 and the inner circumferential surface of the hub 124 for generating radial dynamic pressure, which assists the thrust dynamic pressure.

Preferably, the vertical groove H1 is formed at the outer circumferential surface of the upper plate 131 corresponding to the outer ends of the thrust dynamic pressure grooves G1 and G2 such that the fluid is more smoothly guided to the outer diameter side through the thrust dynamic pressure grooves G1 and G2.

Also, the upper plate 131, at which the thrust dynamic pressure grooves G1 and G2 are formed, is provided with at least one fluid circulating part H2, which is formed through the upper plate 131 from the upper surface to the lower surface thereof. Preferably, the fluid circulating part H2 is disposed at the inside width A of each of the thrust dynamic pressure grooves G1 and G2 or in the vicinity of the inside width A.

Preferably, the inside width A of the upper thrust dynamic pressure groove G1 corresponding to the upper end of the fluid circulating part H2 is narrower than that of the lower thrust dynamic pressure groove G2 corresponding to the lower end of the fluid circulating part H2.

In this case, the thrust dynamic pressure generated at the inside width A of the upper thrust dynamic pressure groove G1 is lower than the thrust dynamic pressure generated at the inside width of the lower thrust dynamic pressure groove G2. As a result, some of the fluid supplied to the lower thrust dynamic pressure groove G2 flows to the upper thrust dynamic pressure groove G1 by the difference in pressure between the upper and lower ends of the fluid circulating part H2.

Figure 7A:
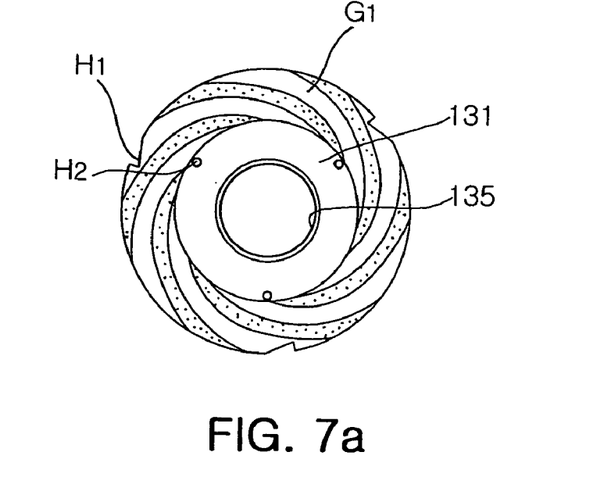
FIG. 7A is a plan view illustrating a spiral sleeve of the spindle motor having the hydrodynamic pressure bearing according to the third preferred embodiment of the present invention.
Figure 7B:
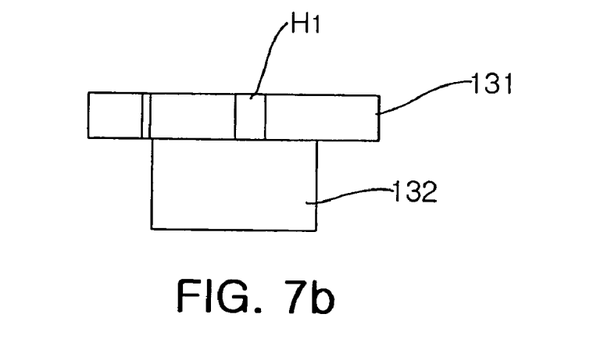
FIG. 7B is a front view illustrating the spiral sleeve of the spindle motor having the hydrodynamic pressure bearing according to the third preferred embodiment of the present invention.
Figure 7C:
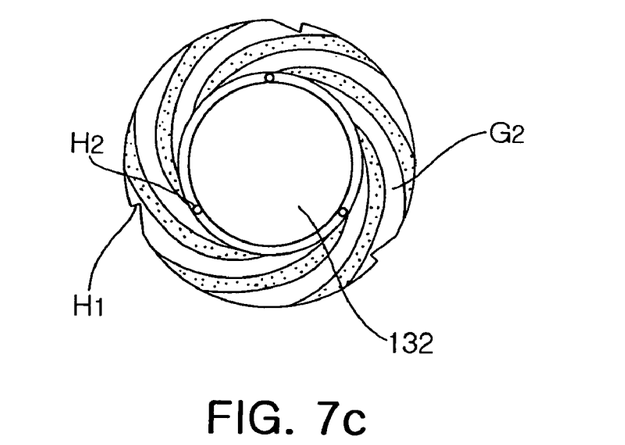
FIG. 7C is a bottom view illustrating the spiral sleeve of the spindle motor having the hydrodynamic pressure bearing according to the third preferred embodiment of the present invention.

As shown in FIGS. 6A, 6B, and 6C, the vertical groove H1 and the fluid circulating part H2 are applied to the herringbone-shaped thrust dynamic pressure grooves G1 and G2 formed at the upper and lower surfaces of the upper plate 131. Alternatively, the vertical groove H1 and the fluid circulating part H2 may be applied to spiral thrust dynamic pressure grooves G1 and G2 as shown in FIGS. 7A, 7B, and 7C, which accomplishes the same effect.

Figure 8:
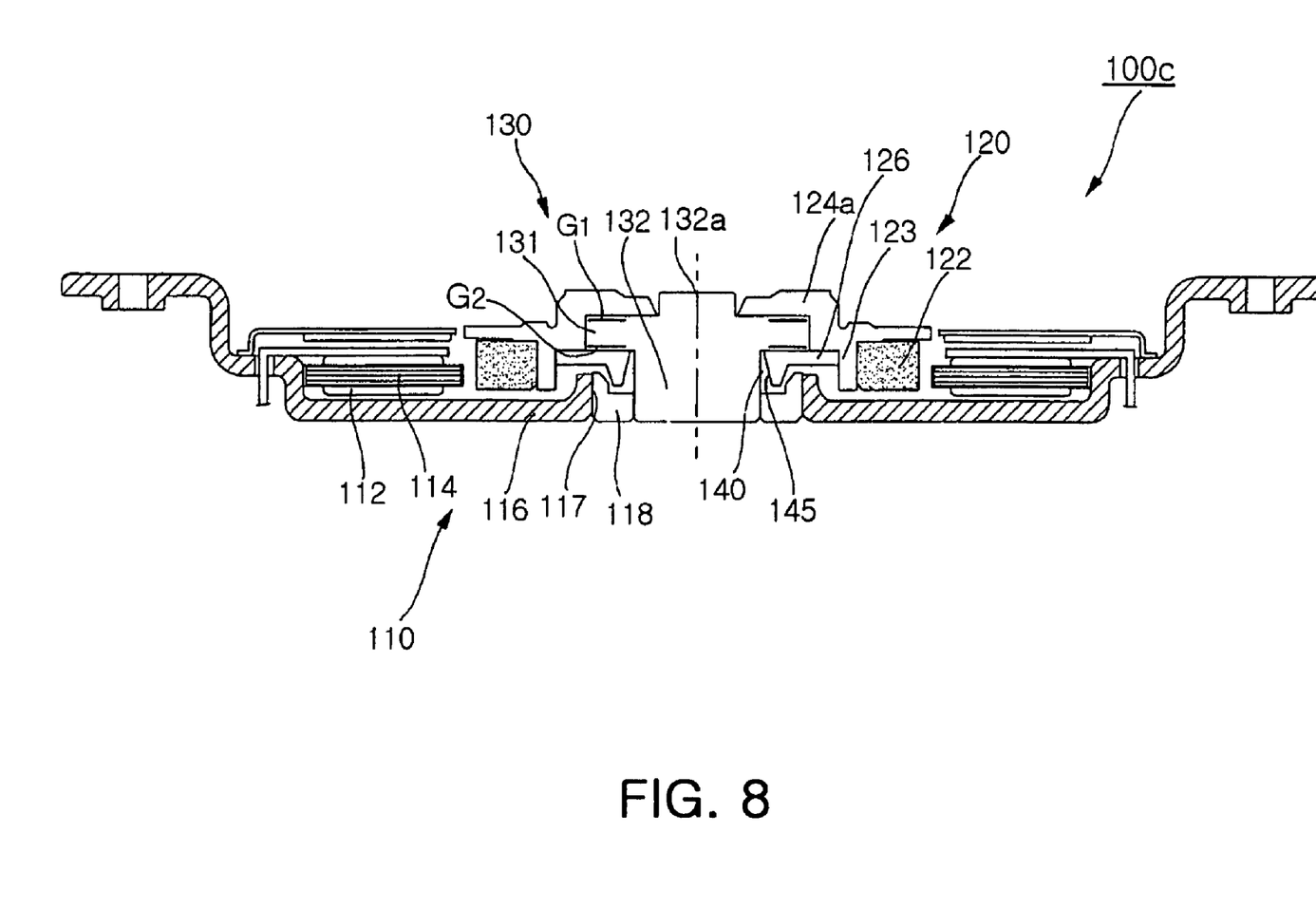
FIG. 8 is a cross-sectional view illustrating a spindle motor having a hydrodynamic pressure bearing according to a fourth preferred embodiment of the present invention.

FIG. 8 is a cross-sectional view illustrating a spindle motor 100c having a hydrodynamic pressure bearing according to a fourth preferred embodiment of the present invention. As shown in FIG. 8, the hub 124, which is adopted in the rotor 120 of the spindle motor 100c, comprises: a skirt part 123, to which the magnets 124 are attached; and a supporting part 124a, having a predetermined size, formed through the hub 124 for allowing a protrusion 132a formed at the upper end of the sleeve 132 to be inserted therethrough.

Specifically, the supporting part 124a having the predetermined size is formed through the center of the upper surface of the hub 124 such that the center of the supporting part 124a is disposed on the same vertical axis as the rotation center of the rotor 120. Preferably, the inner circumferential surface of the supporting part 124a is formed in the shape of a taper whose inner diameter is gradually increased downward to minimize the contact friction between the inner circumferential surface of the supporting part 124a and the outer circumferential surface of the protrusion 132a.

Figure 9:
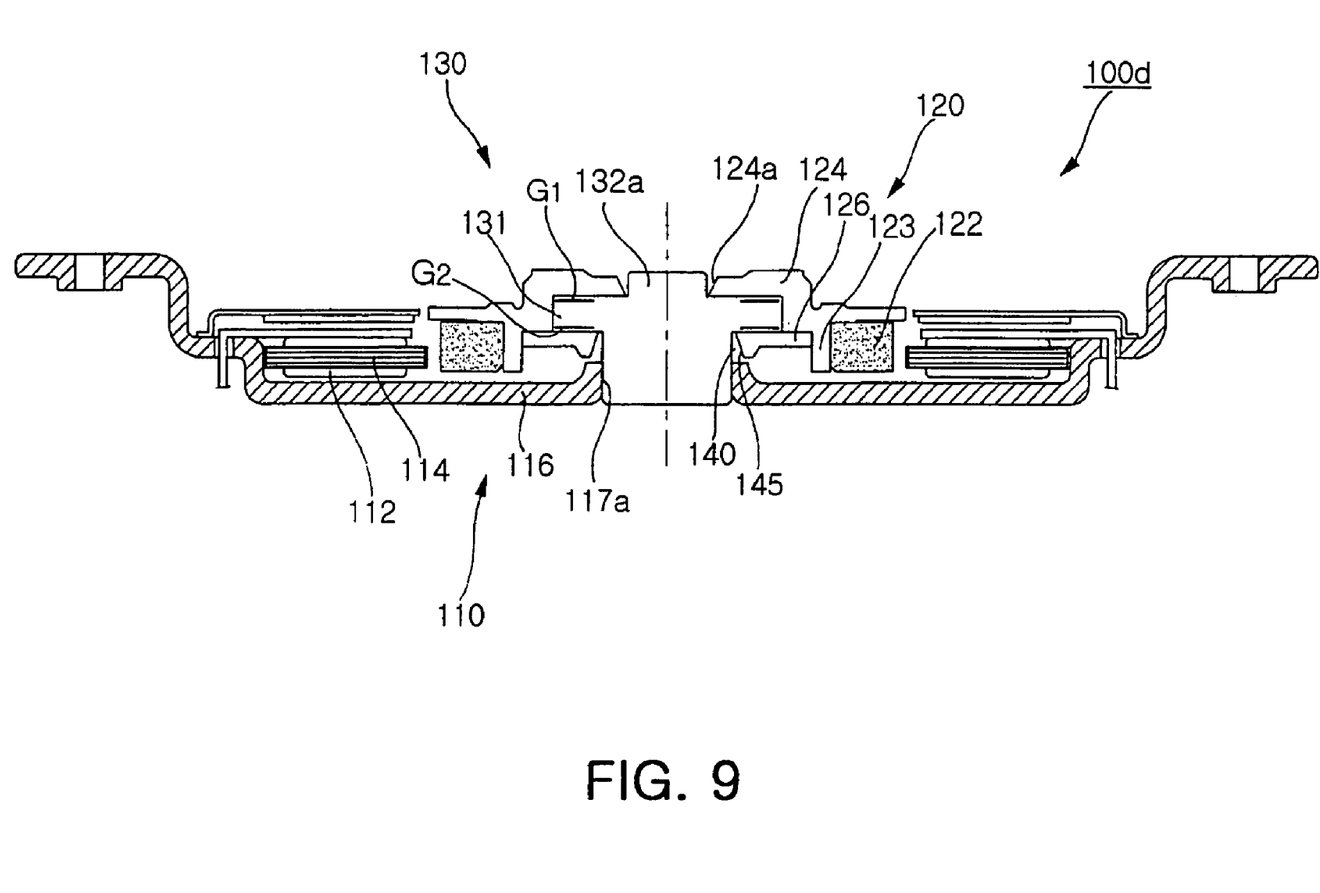
FIG. 9 is a cross-sectional view illustrating a spindle motor having a hydrodynamic pressure bearing according to a fifth preferred embodiment of the present invention.

For the sleeve 132 provided with the protrusion 132a as shown in FIG. 8, the lower end of the sleeve 132 having a small outer diameter is forcibly inserted in the hollow cylindrical housing 118 fitted in the fixing hole 117 of the stator 110. Alternatively, the lower end of the sleeve 132 may be forcibly inserted in the fixing hole 117a formed through the base 116 such that the fixing hole 117a has an inner diameter corresponding to the outer diameter of the lower end of the sleeve 132, as shown in FIG. 9. In this way, another type of spindle motor 100d may be constructed.

In the spindle motors 100, 100a, 100b, and 100c with the above-stated construction, as shown in FIGS. 1, 4, 5, 8, and 9, the rotary body, i.e., the rotor 120, is rotated relative to the stationary body, i.e., the stator 110 at the same principle, when electric current is supplied to the respective spindle motors. Accordingly, the operation of the spindle motor according to the first preferred embodiment will be described hereinafter.

When electric current is supplied to the coil 112 of the stator 110, an electric field having a predetermined strength is generated at the coil 112. By the interaction between the electric field generated at the coil 112 and a magnetic field generated at the magnets 124 of the rotor 120, the hub 124 of the rotor 120 is rotated about the sleeve 132 in one direction.

As the rotor 120 is rotated in one direction, the rotary member, i.e., the hub and the stopper ring, is rotated in one direction relative to the stationary member, i.e., the sleeve 132. At this time, fluid, such as lubricating oil, is supplied in the thrust dynamic pressure groove G1 formed at the upper surface of the upper plate 131 corresponding to the bottom surface of the hub 124 of the rotor 120 and the thrust dynamic pressure groove G2 formed at the lower surface of the upper plate 131 corresponding to the upper surface of the stopper ring 126 of the rotor 120. As a result, the thrust dynamic pressure parts, serving as bearings, are formed at the thrust dynamic pressure grooves G1 and G2, and therefore, the motor is smoothly operated.

The center of dynamic pressure of the thrust dynamic pressure grooves G1 and G2 formed between the upper plate 131 and the rotor 120 approximately corresponds to the center of gravity of the rotary body, i.e., the rotor 120. Consequently, the vertical variation between the center of gravity of the rotary body and the center of dynamic pressure is minimized, which considerably reduces vibration and noise generated when the motor is operated.

As shown in FIG. 3, the size of the inside width A formed at the inside of each of the thrust dynamic pressure grooves G1 and G2 about the imaginary neutral radius NL is larger than that of the outside width B formed at the outside of each of the thrust dynamic pressure grooves G1 and G2 about the imaginary neutral radius NL. Consequently, the thrust dynamic pressure generated at the inside width A when the motor is operated is higher than the thrust dynamic pressure generated at the outside width B.

In this case, some of the fluid supplied to the thrust dynamic pressure grooves G1 and G2 is naturally guided to the outside widths B at which relatively low dynamic pressure is generated due to the difference in pressure between the inside widths A and the outside widths B. The fluid guided into the outside widths B flows into the gap between the outer circumferential surface of the upper plate 131 and the inner circumferential surface of the hub 124, by which auxiliary radial dynamic pressure is generated without forming additional radial dynamic pressure grooves at the hub of the rotor 120, which is the rotary member, and at the upper plate 131 of the sleeve 132, which is the stationary member.

As described above, hydrodynamic pressure sufficient to support the rotation of the rotor 120 is generated by forming only the thrust dynamic pressure grooves G1 and G2 at the outer circumferential surface of the sleeve 132 without forming an additional radial dynamic pressure groove at the outer circumferential surface of the sleeve 132, and therefore, the rotation of the rotor 120 is stably maintained.

In this way, only the thrust dynamic pressure grooves G1 and G2, which are precisely processed with a precision of the µm level, are formed at the sleeve 132 such that the motor is stably operated. Consequently, the processing costs of the grooves are reduced, and therefore, the manufacturing costs of the motor are decreased.

In the case that at least one vertical groove H1 is formed at the outer circumferential surface of the upper plate 131, some of the fluid supplied to the upper thrust dynamic pressure groove G1 forming the upper thrust dynamic pressure part is guided to the outer diameter side of the upper plate 131 due to the difference in dynamic pressure between the inside width A of the upper thrust dynamic pressure groove G1 and the outside width B of the upper thrust dynamic pressure groove G1 when the motor is operated, and is then naturally and smoothly supplied into the gap between the outer circumferential surface of the upper plate 131 and the inner circumferential surface of the hub 124 through the vertical groove H1.

In the case that at least one fluid circulating part H2 is formed at the upper surface of the upper plate 131, some of the fluid supplied to the lower thrust dynamic pressure groove G2 is naturally supplied into the upper thrust dynamic pressure groove G1 through the fluid circulating part H2 by the difference in pressure between the upper and lower ends of the fluid circulating part H2 due to the difference in size between the inside width of the upper thrust dynamic pressure groove G1 and the inside width of the lower thrust dynamic pressure groove G2.

Specifically, the fluid supplied into the upper and lower thrust dynamic pressure grooves G1 and G2 of the upper plate 131 flows to the outer diameter side of the upper plate by the difference in pressure between the insides of the upper and lower thrust dynamic pressure grooves G1 and G2 and the outsides of the upper and lower thrust dynamic pressure grooves G1 and G2 due to the difference in width between the inside widths A of the upper and lower thrust dynamic pressure grooves G1 and G2 and the outside widths B of the upper and lower thrust dynamic pressure grooves G1 and G2, and is then supplied into the gap between the outer circumferential surface of the upper plate 131 and the inner circumferential surface of the hub 124 to generate the radial dynamic pressure. After that, the fluid is filled into the lower thrust dynamic pressure groove G2.

Some of the fluid filled in the lower thrust dynamic pressure groove G2 is supplied into the upper thrust dynamic pressure groove G1 through the fluid circulating part H2 by the difference in pressure between the upper and lower ends of the fluid circulating part H2 due to the difference in size between the inside width of the upper thrust dynamic pressure groove G1 and the inside width of the lower thrust dynamic pressure groove G2.

In this way, the fluid supplied into the thrust dynamic pressure grooves G1 and G2 smoothly flows from the upper part to the lower part and from the lower part to the upper part. As a result, the service life of the fluid is increased, and therefore, the service life of the motor is increased.

Also, the oil storing part 140 is formed between the stopper ring 126 and the sleeve 132. Consequently, oil leaking from the space between the lower surface of the upper plate 131 and the upper plate of the stopper ring 132 is stored by a capillary phenomenon, and therefore, oil is prevented from leaking to the outside.

As shown in FIGS. 1, 5, and 8, the passage connected between oil storing part 140 and the outside is approximately curved in the shape of an "S" due to the coupling structure in which the housing 118, the stopper ring 126, and the sleeve 132 are coupled with each other. As a result, it is very difficult for the oil leaking from the oil storing part 140 to be discharged to the outside through the curved passage, and therefore, the stator or the medium is prevented from being contaminated.

Meanwhile, bubbles generated at the thrust dynamic pressure grooves G1 and G2 do not move upward through the fluid circulating part H2 while the oil is circulated, but are naturally discharged to the outside through the oil storing part 140, which is exposed to the atmospheric pressure.

As apparent from the above description, the thrust dynamic pressure grooves, in which the thrust dynamic pressure is generated, are formed either at the upper plate of the sleeve fixed to the stator or at the hub of the rotor and the stopper ring such that the center of dynamic pressure generated between the sleeve and the rotor when the motor is operated approximately corresponds to the center of gravity of the rotor or vertical variation between the center of dynamic pressure generated between the sleeve and the rotor when the motor is operated and the center of gravity of the rotor is minimized. Consequently, the present invention has the effect of minimizing generation of vibration and noise from the motor, and therefore, improving the performance of the motor.

According to the present invention, the difference in pressure between the insides and the outsides of the dynamic pressure grooves is generated by the difference in size between the inside widths and the outside widths of the thrust dynamic pressure grooves, and the difference in pressure between the upper and lower thrust dynamic pressure grooves is generated by the difference in size between the inside width of the upper thrust dynamic pressure groove and the inside width of the lower thrust dynamic pressure groove. Consequently, the present invention has the effect of circulating fluid supplied in the thrust dynamic pressure grooves when the motor is operated, and therefore, increasing the service life of the liquid and the service life of the motor.

According to the present invention, the total weight of the rotary body, which is rotatably supported by the sleeve, is decreased as compared to the conventional spindle motor. Consequently, the present invention has the effect of decreasing inertia of the rotary body when the motor is operated, and therefore, performing accurate control of the speed of the motor.

According to the present invention, the coupling area between the hub and the stopper ring is increased as compared to the conventional spindle motor. Consequently, the present invention has the effect of improving axial rigidity when the motor is operated and increasing impact resistance, with which the spindle motor sufficiently withstands external impact, and therefore, improving reliability of the motor.

According to the present invention, the structure of the passage connected between the oil storing part for storing oil and the outside of the motor is very complicated. Consequently, the present invention has the effect of maximally preventing oil leaking from the oil storing part from being discharged to the outside of the motor, and therefore, preventing the stator and the medium from being contaminated.

According to the present invention, dynamic pressure sufficient to support the rotation of the rotary body is generated by forming only the thrust dynamic pressure grooves at the outer circumferential surface of the sleeve without the provision of an additional radial dynamic pressure groove. Consequently, the present invention has the effect of reducing the processing costs of the radial dynamic pressure groove, and therefore, decreasing the manufacturing costs of the motor.

According to the present invention, it is not necessary to consider formation of the radial dynamic pressure groove when designing the spindle motor. Consequently, the present invention has the effect of reducing the total height of the spindle motor as compared to the conventional spindle motor having the radial dynamic pressure groove, and therefore, accomplishing miniaturization of the spindle motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spindle motor having a hydrodynamic pressure bearing, comprising:
    a stator including a coil for generating an electromagnetic field when the coil is supplied with electric current to generate a rotary driving force;
    a rotor including magnets disposed opposite to the coil such that the rotor is rotatable relative to the stator; and
    a dynamic pressure generating unit including a sleeve having an upper plate disposed opposite to the rotor while being spaced a predetermined distance from the rotor, the sleeve being fixed to the stator, and at least one thrust dynamic pressure groove formed either at the upper plate of the sleeve corresponding to the rotor or at the rotor for generating dynamic pressure,
    wherein the inside width from a neutral radius of the thrust dynamic pressure groove to an innermost radius of the thrust dynamic pressure groove is larger than the outside width from the neutral radius of the thrust dynamic pressure groove to an outermost radius of the thrust dynamic pressure groove such that dynamic pressure at the inside width of the thrust dynamic pressure groove is higher than dynamic pressure at the outside width of the thrust dynamic pressure groove such that fluid supplied into the thrust dynamic pressure groove is guided to the outer diameter side.

2. The motor as set forth in claim 1, wherein the stator comprises:
    at least one core, on which the coil is wound; and
    a base having a fixing hole, in which the sleeve is vertically fitted.

3. The motor as set forth in claim 2, further comprising:
    a housing fitted in the fixing hole of the stator while the lower end of the sleeve is fixedly inserted in the housing.

4. The motor as set forth in claim 1, wherein the rotor comprises:
   a hub disposed opposite to the upper surface of the upper plate, the hub is provided with the magnets; and
   a stopper ring mounted in the inner surface of the hub, the stopper ring being disposed opposite to the lower surface of the upper plate.

5. The motor as set forth in claim 4, wherein the hub comprises:
   a skirt part, to which the magnets are attached; and
   a shaft extending downward by a predetermined length such that the shaft is fitted in a shaft hole of the sleeve.

6. The motor as set forth in claim 4, wherein the hub comprises:
   a skirt part, to which the magnets are attached; and
   a supporting part formed through the hub for allowing a protrusion formed at the upper end of the sleeve to be inserted therethrough.

7. The motor as set forth in claim 4, wherein the at least one thrust dynamic pressure groove comprises thrust dynamic pressure grooves formed at the lower surface of the hub of the rotor corresponding to the upper plate of the sleeve or at the upper surface of the stopper ring of the rotor, respectively.

8. The motor as set forth in claim 1, wherein the at least one thrust dynamic pressure groove is formed in the shape of a herringbone.

9. The motor as set forth in claim 1, wherein the at least one thrust dynamic pressure groove is formed either at the upper surface or at the lower surface of the upper plate of the sleeve.

10. The motor as set forth in claim 1, wherein the at least one thrust dynamic pressure groove comprises thrust dynamic pressure grooves formed at the upper and lower surfaces of the upper plate of the sleeve, respectively.

11. The motor as set forth in claim 4, wherein the at least one thrust dynamic pressure groove is formed either at the lower surface of the hub of the rotor corresponding to the upper plate of the sleeve or at the upper surface of the stopper ring of the rotor.

12. The motor as set forth in claim 1, wherein the upper plate of the sleeve is provided at the outer circumferential surface thereof with at least one vertical groove.

13. The motor as set forth in claim 12, wherein the at least one vertical groove is formed at the outer circumferential surface of the upper plate of the sleeve corresponding to the outer end of the thrust dynamic pressure groove.

14. The motor as set forth in claim 1, wherein the upper plate of the sleeve is provided with at least one fluid circulating part, which is formed through the upper plate from the upper surface to the lower surface thereof.

15. The motor as set forth in claim 14, wherein the at least one fluid circulating part is disposed either at the inside width of the thrust dynamic pressure groove or in the vicinity of the inside width of the thrust dynamic pressure groove.

16. The motor as set forth in claim 14, wherein the inside width of the upper thrust dynamic pressure groove corresponding to the upper end of the fluid circulating part is narrower than that of the lower thrust dynamic pressure groove corresponding to the lower end of the fluid circulating part.

* * * * *